US011113355B2

(12) United States Patent
Ahn

(10) Patent No.: US 11,113,355 B2
(45) Date of Patent: Sep. 7, 2021

(54) NETWORK SERVER AND METHOD FOR PROVIDING WEBPAGE TO USER TERMINAL

(71) Applicant: NHN Corporation, Gyeonggi-do (KR)

(72) Inventor: Jung Ho Ahn, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/513,641

(22) Filed: Jul. 16, 2019

(65) Prior Publication Data

US 2020/0050645 A1 Feb. 13, 2020

(30) Foreign Application Priority Data

Aug. 8, 2018 (KR) .......................... 10-2018-0092215

(51) Int. Cl.
*G06F 16/954* (2019.01)
*H04L 29/08* (2006.01)
(Continued)

(52) U.S. Cl.
CPC .......... *G06F 16/954* (2019.01); *G06F 3/0481* (2013.01); *G06F 3/0485* (2013.01);
(Continued)

(58) Field of Classification Search
CPC .. G06F 16/954; G06F 16/9577; G06F 16/986; G06F 2203/04803; G06F 16/278;
(Continued)

(56) References Cited

U.S. PATENT DOCUMENTS

2004/0034559 A1* 2/2004 Harris .................... G06Q 30/02
705/14.66
2008/0040683 A1* 2/2008 Walsh ................. G06F 3/04855
715/786
(Continued)

FOREIGN PATENT DOCUMENTS

JP 2014-75006 4/2014
JP 2017-129752 7/2017
(Continued)

OTHER PUBLICATIONS

Office Action dated Mar. 30, 2020 for Korean Patent Application No. 10-2018-0092215 and its English translation provided by Applicant's foreign counsel.
(Continued)

*Primary Examiner* — Chau T Nguyen
(74) *Attorney, Agent, or Firm* — Ladas & Parry, LLP

(57) ABSTRACT

A network server includes a webpage provider, a user monitor, and a content selector. The webpage provider is configured to provide to a user terminal a webpage including a first region and a second region arranged in a first direction in response to a request from the user terminal. The first region includes pieces of first content arranged in a second direction crossing the first direction, and the second region includes pieces of second content arranged in the second direction. The user monitor is configured to detect an action of the user terminal for the pieces of first content. The content selector is configured to search for pieces of third content related to the content for which the action of the user terminal is detected among the pieces of first content in a database, and to include the pieces of third content in the second region.

14 Claims, 8 Drawing Sheets

(51) Int. Cl.
*G06F 16/958* (2019.01)
*G06F 16/957* (2019.01)
*G06F 16/27* (2019.01)
*G06F 3/0481* (2013.01)
*G06F 3/0485* (2013.01)

(52) U.S. Cl.
CPC ........ *G06F 16/278* (2019.01); *G06F 16/9577* (2019.01); *G06F 16/986* (2019.01); *H04L 67/02* (2013.01); *H04L 67/18* (2013.01); *H04L 67/22* (2013.01)

(58) Field of Classification Search
CPC ..... G06F 3/0481; G06F 3/0485; H04L 67/02; H04L 67/18; H04L 67/22; G09G 2310/04; G09G 2320/0261; G05B 2219/39396; G06Q 30/0241
See application file for complete search history.

(56) References Cited

U.S. PATENT DOCUMENTS

| | | | | |
|---|---|---|---|---|
| 2009/0327275 | A1* | 12/2009 | Walker | G06F 16/972 |
| 2012/0239466 | A1* | 9/2012 | Hu | G06Q 30/0269 |
| | | | | 705/14.1 |
| 2014/0108929 | A1* | 4/2014 | Garmark | G06F 3/04842 |
| | | | | 715/716 |
| 2014/0115114 | A1* | 4/2014 | Garmark | H04L 65/60 |
| | | | | 709/219 |
| 2014/0310624 | A1* | 10/2014 | Peng | G06F 40/106 |
| | | | | 715/765 |
| 2014/0310713 | A1* | 10/2014 | Kaldor | G06F 3/0481 |
| | | | | 718/102 |
| 2015/0339006 | A1* | 11/2015 | Chaland | G06F 3/0485 |
| | | | | 715/835 |
| 2015/0339033 | A1* | 11/2015 | Arnold | G06F 9/451 |
| | | | | 715/854 |
| 2018/0018304 | A1* | 1/2018 | Pritchard | G06F 3/0481 |
| 2018/0285474 | A1* | 10/2018 | Oh | G06F 16/9577 |

FOREIGN PATENT DOCUMENTS

| | | |
|---|---|---|
| KR | 10-2013-0089757 | 8/2013 |
| KR | 10-1418821 | 7/2014 |
| KR | 10-2014-0105042 | 9/2014 |
| KR | 10-2015-0035100 | 4/2015 |
| KR | 10-1876412 | 7/2018 |
| WO | 2014/155683 | 10/2014 |

OTHER PUBLICATIONS

"A simple way to extract YouTube songs easily catch up", http://shinbaksacom/220643849231, Mar. 3, 2016.

Office Action dated Sep. 29, 2020 for Japanese Patent Application No. 2019-135449 and its English translation provided by Applicant's foreign counsel.

* cited by examiner

NETWORK SERVER AND METHOD FOR PROVIDING WEBPAGE TO USER TERMINAL

CROSS-REFERENCE TO RELATED APPLICATION

This application claims priority to Korean Patent Application No. 10-2018-0092215, filed on Aug. 8, 2018, the entire content of which is incorporated herein by reference.

BACKGROUND

1. Technical Field

The present disclosure generally relates to a network system, and more particularly, to a network server and a method for provide a webpage to a user terminal.

2. Related Art

Recently, with the development of a data communication network, many people use Internet, and thus various services using the Internet have been provided. Among such services, a social network service (SNS) is an online service or a platform in which a social network is constructed and is shown among users who share concerns or activities. Such a social network may be implemented through one or more webpages.

When a webpage is provided to a user terminal, an advertising message may also be provided together. If a user clicks the advertising message, the user can move to a webpage for purchasing a corresponding product or to a webpage including detailed photos of the corresponding product and detailed information on the product. However, if such an advertising message is not related to user's interest or concerns or it has low relation to the user's interest or concerns, advertising effects through the advertising message are relatively lowered. Further, if such an advertising message is provided to a user terminal as a popup message, the user is exposed to the advertising message even in the case where the advertising message does not correspond to information desired by the user, and this may cause inconvenience to the user. If the user terminal does not permit the popup message, the advertising message is unable to be provided to the user.

The above-described contents are only to help understanding of a background technology of technical subject matters of the present disclosure, and thus they should not be understood as the contents corresponding to the related art known to those skilled in the art to which the present disclosure pertains.

SUMMARY

Various embodiments of the present disclosure may be directed to a network server and an operation method thereof, which provide to a user terminal with content that is expected to have a high possibility of arousing a user's interest.

Some embodiments of the present disclosure are directed to a network server and an operation method thereof, which provide improved reliability with regard to exposure to content.

In one aspect of the present disclosure, a network server for providing a webpage through communication with a user terminal through a network, may include a webpage provider configured to provide a webpage including a first region and a second region arranged in a first direction in response to a request from the user terminal, wherein the first region includes pieces of first content arranged in a second direction crossing the first direction, and the second region includes pieces of second content arranged in the second direction; a user monitor configured to detect an action of the user terminal for the pieces of first content; and a content selector configured to search for pieces of third content related to the content for which the action of the user terminal is detected among the pieces of first content in a database, and to include the pieces of third content in the second region.

The content selector may be configured to change any one of the pieces of second content to the third content.

The webpage provider may be configured to provide a part of the pieces of second content to the user terminal if a request signal in accordance with a user input to scroll the second region is received from the user terminal, and the content selector may be configured to include the third content in the part of the pieces of second content.

The respective pieces of first content may include items capable of being updated by the user terminal, and the action of the user terminal may include the update by the user terminal.

The items capable of being updated by the user terminal may include count values being changed in response to a selection of the user terminal.

The items capable of being updated by the user terminal may include a comment being generated by the user terminal.

The webpage may further include a third region arranged in the first direction together with the first and second regions, the first region may extend in the second direction between the second region and the third region, and the second region may be adjacent to the first region and may extend in the second direction.

The webpage may further include a third region arranged in the first direction together with the first and second regions, the second region may extend in the second direction between the first region and the third region, and the first region may be adjacent to the second region and may extend in the second direction.

In another aspect of the present disclosure, a method for operating a network server communicating with a user terminal through a network, may include providing a webpage including a first region and a second region arranged in a first direction in response to a request from the user terminal, wherein the first region includes pieces of first content arranged in a second direction crossing the first direction, and the second region includes pieces of second content arranged in the second direction; detecting an action of the user terminal for the pieces of first content; searching for pieces of third content related to the content for which the action of the user terminal is detected among the pieces of first content in a database; and including the pieces of third content in the second region.

The including the third content in the second region may include changing any one of the pieces of second content to the third content.

The providing the webpage may include providing a part of the pieces of second content to the user terminal if a request signal in accordance with a user input to scroll the second region is received from the user terminal, and the including the third content in the second region may include including the third content in the part of the pieces of second content.

In still another aspect of the present disclosure, a computer device for providing a web service through communication with a user terminal through a network, may include a communicator connected to the network; and a processor configured to communicate with the user terminal through the communicator, wherein the processor is configured to provide a webpage including a first region and a second region arranged in a first direction in response to a request from the user terminal, wherein the first region includes pieces of first content arranged in a second direction crossing the first direction, and the second region includes pieces of second content arranged in the second direction; detect an action of the user terminal for the pieces of first content; and search for pieces of third content related to the content for which the action of the user terminal is detected among the pieces of first content in a database, and include the third content in the second region.

The processor may be configured to change any one of the pieces of second content to the third content.

The processor may be configured to provide a part of the pieces of second content to the user terminal if a request signal in accordance with a user input to scroll the second region is received from the user terminal, and to include the third content in the part of the pieces of second content.

The respective pieces of first content may include items capable of being updated by the user terminal, and the action of the user terminal may include the update by the user terminal.

According to certain embodiments of the present disclosure, a network server and an operation method thereof may provide to a user terminal with content that is expected to have a high possibility of arousing a user's interest.

According to some embodiments of the present disclosure, a network server and an operation method thereof may provide have improved reliability with regard to exposure to content.

DETAILED DESCRIPTION

Hereinafter, preferred embodiments of the present disclosure will be described in detail with reference to the accompanying drawings. In the following description, it is to be noted that only portions that are necessary to understand the operations according to the present disclosure will be described, and description of other portions will be omitted in order not to obscure the subject matter of the present disclosure. Further, the present disclosure is not limited to the embodiments as described hereinafter, but may be embodied in different forms. However, the embodiments as described hereinafter are only for specific details provided to assist those of ordinary skill in the art to which the present disclosure pertains in a comprehensive understanding of the disclosure.

In the entire description, the term "connected to" that is used to designate a connection of one element to another element includes both a case that an element is "directly connected to" another element and a case that an element is "indirectly connected to" another element via still another element. Here, the terms used herein are to explain specific embodiments, but are not intended to limit the present disclosure. In the entire description, the term "includes" or "including" used to designate that a certain portion "includes" a certain component means that other components are not excluded, but may be further included unless specially described to the contrary. The terms "at least any one of X, Y, and Z" and "at least any one selected from a group consisting of X, Y, and Z" may be analyzed as one X, one Y, one Z, or a certain combination of two or more of X, Y, and Z (e.g., XYZ, XYY, YZ, or ZZ). Here, the term "and/or" includes one or more of all combinations of corresponding configurations.

Figure 1:
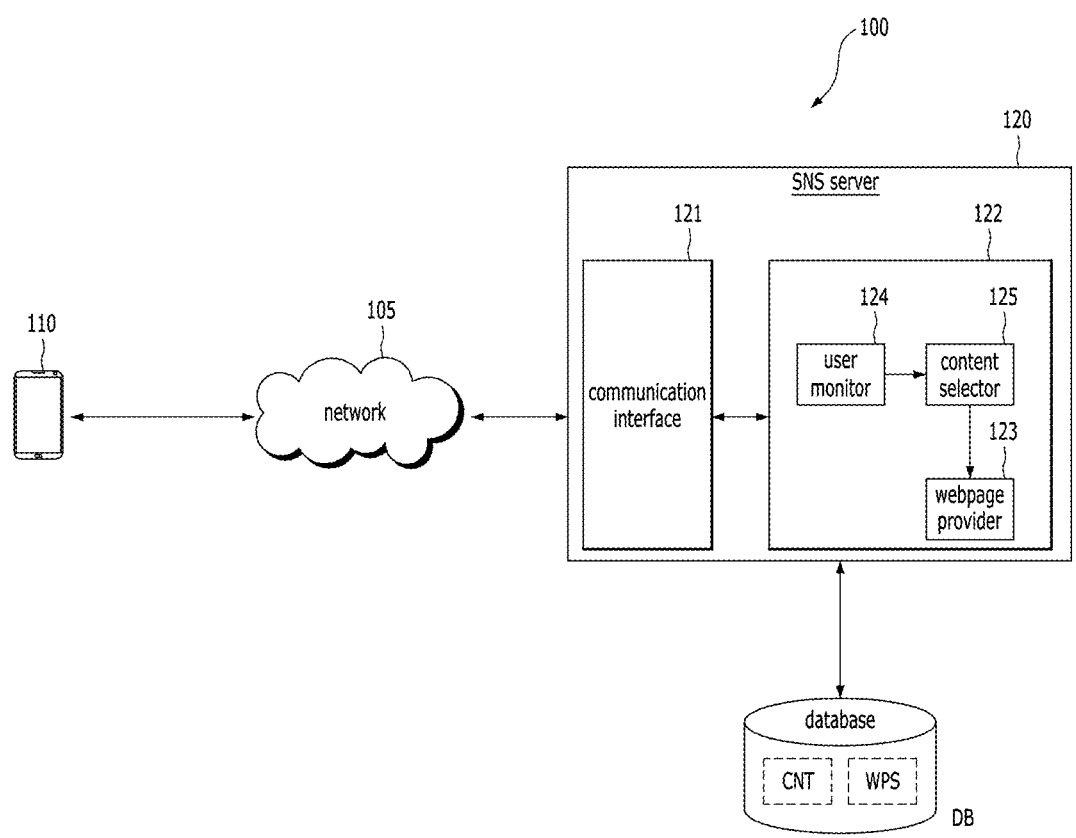
FIG. 1 is a block diagram of a network system according to an embodiment of the present disclosure.
Figure 2:
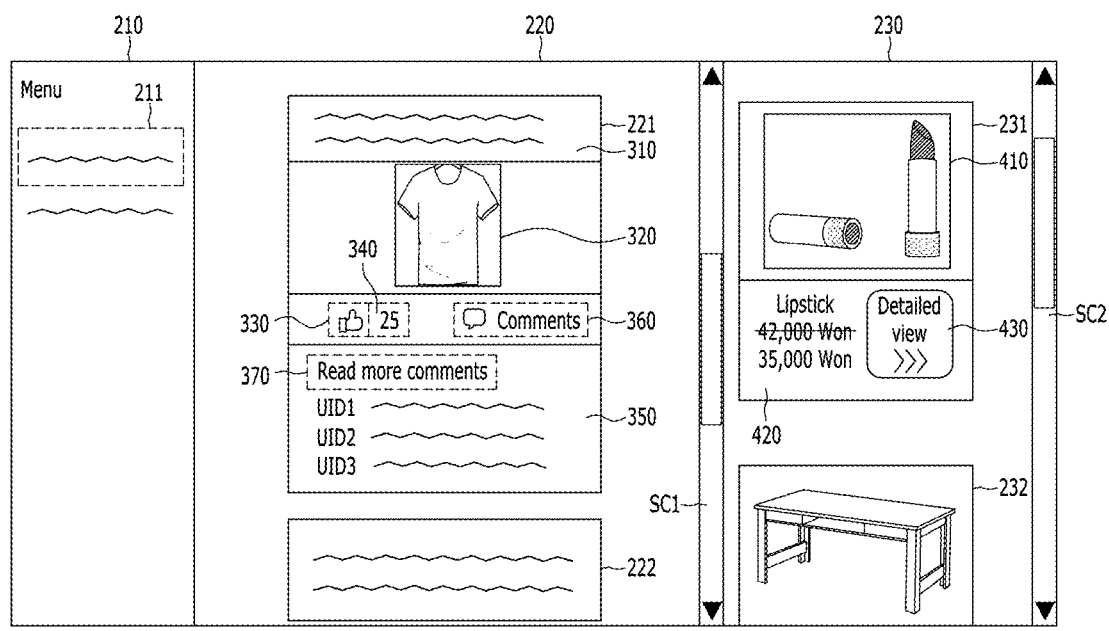
FIG. 2 is a diagram illustrating an embodiment of a webpage provided by a network server of FIG. 1.
Figure 3:
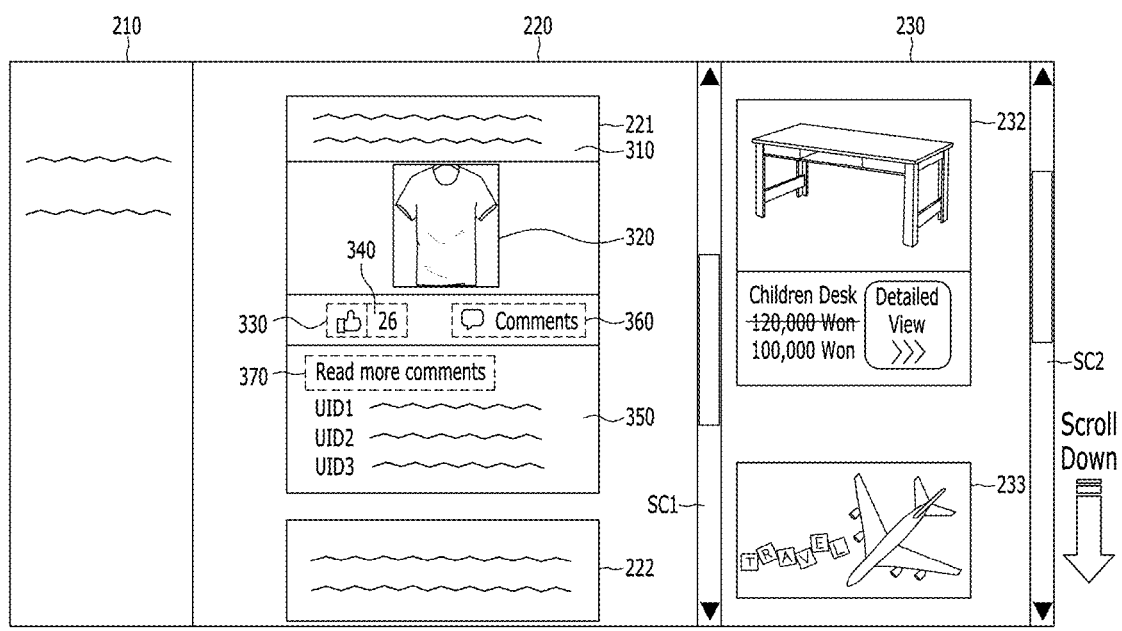
FIG. 3 is a diagram illustrating a first screen of a webpage that is displayed on a user terminal when a banner region of the webpage is scrolled.
Figure 4:
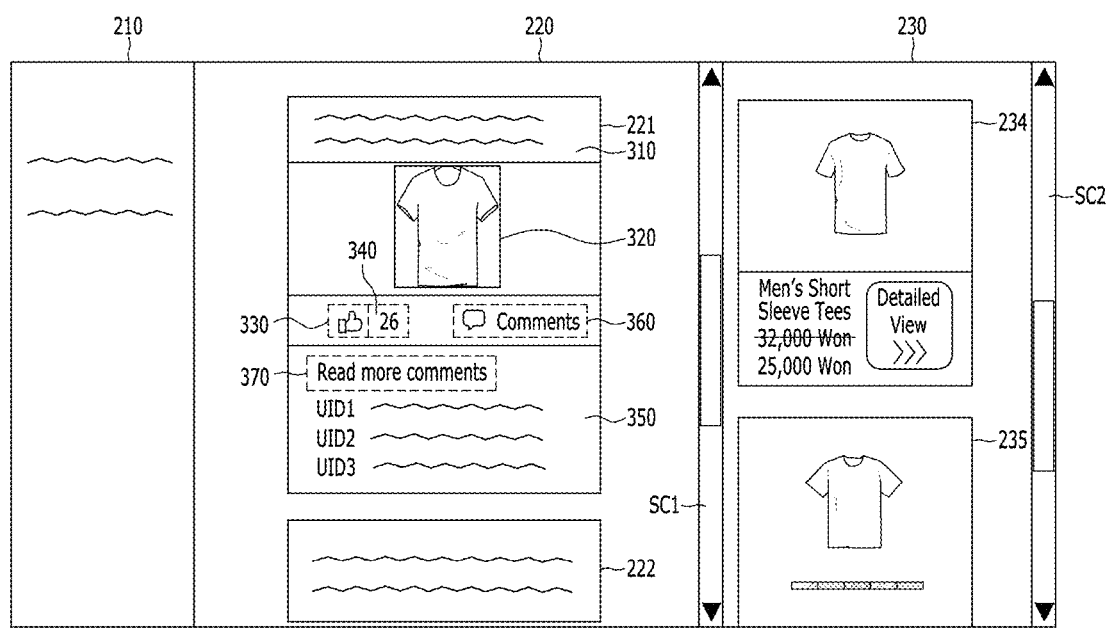
FIG. 4 is a diagram illustrating a second screen of a webpage that is displayed on a user terminal when a banner region of the webpage is scrolled.

FIG. 1 is a block diagram of a network system according to an embodiment of the present disclosure, and FIG. 2 is a diagram illustrating an embodiment of a webpage provided by a network server of FIG. 1 (e.g. an SNS server). FIG. 3 is a diagram illustrating a first screen of a webpage that is displayed on a user terminal when a banner region of the webpage is scrolled, and FIG. 4 is a diagram illustrating a second screen of a webpage that is displayed on a user terminal when a banner region of a webpage is scrolled.

Referring to FIG. 1, a network system 100 includes a network 105, a user terminal 110, and a network server 120 (e.g. a social network service (SNS) server).

The network system 100 may include a plurality of devices, servers, and/or software configurations, which operate to perform various methods according to embodiments of the present disclosure as described herein. As illustrated in FIG. 1, the devices and/or servers may be configured in different types, and operations and services provided by the devices and/or servers may be combined with or separated from each other for the embodiments described hereinafter, or may be performed by a larger or smaller number of devices and/or servers. One or more devices and/or servers may be driven and/or maintained by the same or different entities or enterprises.

The network 105 connects various components in the network system 100, such as the user terminal 110 and the SNS server 120. The network 105 may include at least one of a public network, a private network, a wired network, a wireless network, other proper types of network, and combinations thereof.

The user terminal 110 may communicate with the SNS server 120 over or through the network 105. The user terminal 110 may be subscribed in a service provided by the SNS server 120, for instance, by registering a user account through an access to the SNS server 120, and may receive and display data or information, such as a webpage, provided from the SNS server 120. Further, the user terminal 110 may perform operations or actions for updating content in the webpage.

The user terminal 110 may include one or more processors for executing computer programs including instructions stored in a computer-readable medium, memories, and other suitable components. The user terminal 110 may execute an application to access the SNS server 120. For example, the user terminal 110 may access the SNS server 120 through an application, such as a web browser.

In embodiments, the user terminal 110 may include devices capable of transmitting and receiving information in wired and/or wireless communication environments, such as a computer, ultra-mobile PC (UMPC), workstation, netbook, personal digital assistants (PDA), portable computer, web tablet, wireless phone, mobile phone, smart phone, e-book, portable multimedia player (PMP), and portable game machine.

A network server, such as the SNS server 120, may communicate with the user terminal 110 through the network 105. The SNS server 120 is configured to provide data or information such as a webpage in response to a request from the user terminal 110. The SNS server 120 may include, or be connected to, a database (DB) storing data or information associated with webpages therein. Alternatively, the database (DB) can be stored in another server other than the SNS server 120. If the user terminal 110 requests a webpage by accessing the SNS server 120 through a user account, the SNS server 120 may provide the requested webpage from the database (DB) to the user terminal 110.

The SNS server 120 may include a communication interface (I/F) 121 and a controller 122. The controller 122 may communicate with the user terminal 110 over the network 105 through the communication interface 121. The communication interface 121 may include at least one of a wired communication function and a wireless communication function, and thus it may communicate with the user terminal 110 through the network 105.

FIG. 1 illustrates an exemplary embodiment that the database (DB) is located outside the SNS server 120. The SNS server 120 may communicate with the database (DB) through the communication interface 121. However, this is exemplary, and the present disclosure is not limited thereto. For example, a whole or at least a part of the database (DB) may be included in the SNS server 120.

The database (DB) may store pieces of content (CNT) and webpage sources (WPS). The webpage sources (WPS) may include data structures of webpages, and the data structures may include links of the pieces of content (CNT) (e.g., storage locations in the database).

The content may include digital data and/or signals, such as a text, sound, image, and video, and it may be visualized or output through an output device such as a display or speaker of the user terminal 110. For example, the content stored in the database (DB) may include a post registered by the user account. Further, the content stored in the database (DB) may include an advertisement (e.g., banner advertisement) of a specific product.

The controller 122 may be configured to control the overall operation of the SNS server 120. The controller 122 may include a webpage provider 123, a user monitor 124, and a content selector 125.

The webpage provider 123 may be configured to provide a webpage in response to a request from the user terminal 110. If the user terminal 110 requests a webpage to the SNS server 120, the webpage provider 123 may provide a corresponding webpage source and pieces of content linked by the webpage source from the database (DB) to the user terminal 110. The user terminal 110 displays the received webpage so that a user can view the webpage.

Referring to FIG. 2 together with FIG. 1, the webpage provided by the webpage provider 123 may include a menu region 210, a main region 220, and a banner region 230, which are arranged in a first direction, for example, but not limited to, a horizontal direction.

The menu region 210 may extend in a second direction, for example, but not limited to, a vertical direction. The second direction may be different from the first direction. For example, the first direction may cross or be substantially perpendicular to the second direction. The menu region 210 may include various pieces of information if needed. For example, the menu region 210 may include a link for a specific webpage, for example, a region 211 having a uniform resource locator (URL). If the user terminal 110 receives a user input for selecting the region 211, the user terminal 110 may request and receive a webpage of the corresponding link of the region 211 from the SNS server 120.

The main region 220 may extend in the second direction such as the vertical direction, and may include plural pieces of content arranged in the vertical direction. FIG. 2 illustrates that parts of content 221 and content 222 are displayed on the main region 220. The user terminal 110 may receive from the SNS server 120 in advance next pieces of content of the content 221 and 222 being displayed on the main region 220, and may store the next pieces of content in an internal buffer memory of the user terminal 110. The main region 220 may further include a first scrollbar SC1. If the user terminal 110 receives a user input to scroll down or up the first scrollbar SC1, the user terminal 110 may display the pieces of content stored in the internal buffer memory on the main region 220 in order, while requesting and receiving the next pieces of content from the SNS server 120.

In embodiments of the present disclosure, the pieces of content 221 and 222 of FIG. 2 may be included in one sub-webpage. The pieces of content included in the next sub-webpage may be displayed in response to the user input to scroll the first scrollbar SC1. As described above, the main region 220 may include plural sub-webpages arranged in the vertical direction.

Each of the respective pieces of content 221 and 222 of the main region 220 may include, for example, but not limited to, a post. The post may include a post 310 and an image 320. Further, the post may include at least one item that can be updated by a plurality of user accounts. That is, the post registered by a certain user account may be updated, for example, may be evaluated by the plurality of user accounts. For example, the post includes a first region 330 on which "I like it" or a corresponding symbol is displayed and a second region 340 adjacent to the first region 330 and configured to display a count value. The SNS server 120 may update the post so that the count value of the second region 340 can be increased when the respective user accounts select (e.g., click) the first region 330. If the number of user accounts having selected the first region 330 is 25, the count value of the second region 340 becomes 25 as illustrated in FIG. 2.

The post may further include a third region 350 including comments left by the user accounts. If a user selects a fourth region 360 on which "comment" is displayed, the SNS server 120 may support a function whereby the user account can leave a comment on the third region 350. The SNS server 120 may update the third region 350 so as to add or remove the comment input by the user account. FIG. 2 illustrates that comments by the first to third user accounts UID1 to UID3 are displayed or included in the third region 350. If the user selects "Read more comments" on a fifth region 370, the SNS server 120 may support a function of displaying more comments included in the posts which are not shown in the third region 350.

The banner region 230 may extend in the second direction, for example, the vertical direction, and include plural pieces of content arranged in the vertical direction. FIG. 2 illustrates that parts of content 231 and content 232 are displayed on the banner region 230. The user terminal 110 may receive from the SNS server 120 in advance next pieces of content of the content 231 and 232 being displayed on the banner region 230, and may store the next pieces of content in the internal buffer memory of the user terminal 110. The banner region 230 may further include a second scrollbar SC2. If the user terminal 110 receives a user input to scroll the second scrollbar SC2, the user terminal 110 may display the pieces of content stored in the internal buffer memory on the banner region 230 in order, while requesting and receiving the next pieces of content from the SNS server 120.

In embodiments of the present disclosure, the pieces of content 231 and 232 of FIG. 2 may be included in one sub-webpage. The pieces of content included in the next sub-webpage may be displayed in response to the user input to scroll the second scrollbar SC2. As described above, the banner region 230 may include plural sub-webpages arranged in the vertical direction.

Each of the respective pieces of content 231 and 232 of the banner region 230 may include a first region 410 on which an image of a specific product is displayed, a second region 420 on which information related to the product is displayed, and a third region 430 including a link of a webpage for selling the corresponding product, a webpage including detailed photos of the corresponding product and related detailed information of the product, or any webpage related to the product. The related information may include information related to the corresponding product, such as a name of a product, a product photo, a selling price, and a discount price.

The user monitor 124 is configured to monitor or detect an operation or action of the user terminal 110 related to the content. For instance, the action of the user terminal 110 may comprise an input of the user terminal 110 or an input received from the user through the user terminal 110. The action of the user terminal 110 may comprise, for example, but not limited to, a request signal generated by the user terminal 110 caused by a selection of the content, such as a click or a touch. In embodiments of the present disclosure, the action of the user terminal 110 may include a signal requesting an update of the content on the main region 220. For example, the action of the user terminal 110 may be a signal for requesting an update of the second region 340 caused by the user input by selecting the first region 330 of the content 221. For example, the action of the user terminal 110 may be a request signal generated by the user terminal 110 in order to add, include, or remove the comment in the third region 350 of the content 221.

The content selector 125 is configured to search for content in the database (DB) corresponding or related to the content for which the action of the user terminal 110 is detected, for example, advertising content. If needed, the related content may be searched for through various methods. In embodiments, the content selector 125 may search for the related content among the pieces of content (CNT) stored in the database (DB) based on, for example, but not limited to, a text (i.e., 310) included in the content for which the action of the user terminal 110 is detected. For example, if a text "short sleeve tees" is included in the content for which the action of the user terminal 110 is detected, the content selector 125 may search for the content including the text "short sleeve tees" or a related text in the database (DB). In another embodiments, the content selector 125 may search for the content having a matching image by comparing an image included in the content for which the action of the user terminal 110 is detected with the pieces of content (CNT) in the database (DB). For example, the content selector 125 may include an image search engine, and may compare images with each other through the image search engine.

The content selector 125 may control the webpage provider 123 to include the searched content in the banner region 230 of the webpage. In embodiments, the content selector 125 may control the webpage provider 123 to change any one of the pieces of content included in the banner region 230 to the searched content.

Referring to FIG. 3, the user of the user terminal 110 may select the first region 330 of the content 221 of the main region 220. Then, the count value of the second region 340 of the content 221 is increased. The count value of the second region 340 may be increased to 26 as illustrated in FIG. 3. The user monitor 124 is configured to detect the action of the user terminal 110 corresponding or related to the content 221 of the main region 220 as described above.

The content selector 125 may have or display the content 221 for which the action of the user terminal 110 is detected, or the content 221 corresponding to the action of the user terminal 110, and the related content in the banner region 230. The related content may be provided as any one of the pieces of content of the banner region 230 provided when the second scrollbar SC2 is scrolled. For example, in accordance with the scrolling, the pieces of content 232 and 233 next to or below the content 231 of FIG. 2 may be displayed on the banner region 230. FIG. 4 show a webpage assuming that the user further scrolls the second scrollbar SC2 at the webpage of FIG. 3. Referring to FIG. 4, pieces of content 234 and 235 that are searched for by the content selector 125 may be displayed on the screen.

According to an embodiment of the present disclosure, the SNS server 120 detects the action of the user terminal 110 in the main region 220, and includes or add the content related to the action of the user terminal 110 in or to the banner region 230. Accordingly, the content that is expected to be concerned or interested by the user may be provided, and therefore, if the content is the advertising content, it may be expected to improve the advertising effects. Further, since the content is provided as a part of the webpage, such as the banner region 230, rather than a type, such as a popup message, the content may be exposed regardless of the settings for the popup message in the user terminal 110. Accordingly, the SNS server 120 can provide improved reliability with respect to the exposure of the content.

Figure 5:
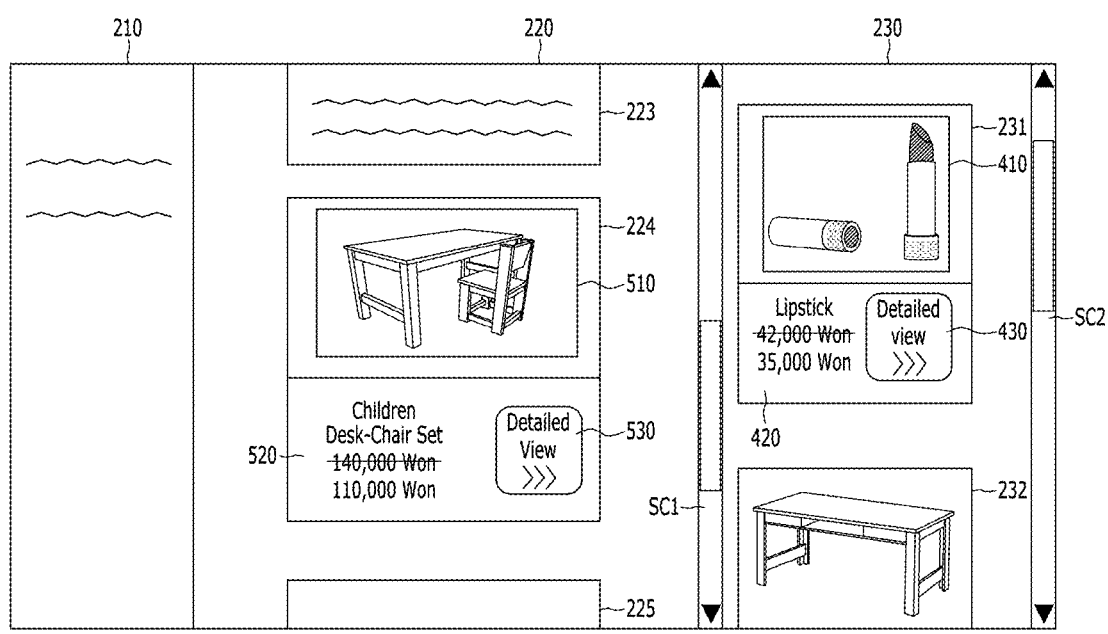
FIG. 5 is a diagram illustrating a third screen of a webpage that is displayed on a user terminal when a main region of the webpage is scrolled.

FIG. 5 illustrates an embodiment of a third screen that is displayed on a user terminal when a main region of a webpage is scrolled.

FIG. 5 shows an exemplary case that the user of the user terminal 110 selects the content 232 of the banner region 230. The user monitor 124 of the SNS server 120 may detect such a user's action through the user terminal 110 for the content 232 of the banner region 230.

The content selector 125 may include or add the action-detected content 232 and the related content in or to the main region 220. FIG. 5 illustrates an exemplary embodiment that the first scrollbar SC1 is scrolled and pieces of content 223, 224, and 225 next to or below the content 222 of FIG. 2 are displayed on the main region 220. The content selector 125 may change any one of the pieces of content 223, 224, and 225 to content related to the content 232 for which the action of the user terminal 110 is detected. The content 224 may include a first region 510 on which an image of a specific product is displayed, a second region 520 on which information related to the product is displayed, and a third region 530 including a link of a webpage for selling the corresponding product.

As described above, the SNS server 120 may detect the action or input of the user terminal 110 in the banner region 230, and may include the content related or corresponding to the action or input of the user terminal 110 in the main region 220. Accordingly, the content that is expected to be concerned or interested by the user may be provided to the webpage. Further, since the content is provided as a part of the webpage, rather than a type, such as a popup message, the content may be exposed regardless of the settings for the popup message in the user terminal 110, and thus the SNS server 120 may provide improved reliability with respect to the exposure of the content.

Figure 6:
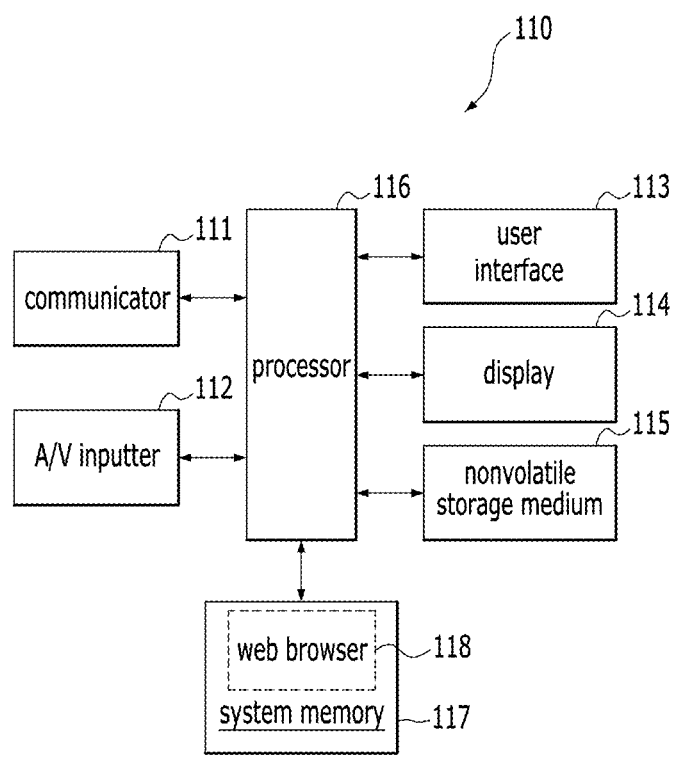
FIG. 6 is a block diagram illustrating an embodiment of a user terminal of FIG. 1.

FIG. 6 is a block diagram illustrating an embodiment of a user terminal of FIG. 1.

Referring to FIG. 6, the user terminal 110 includes a communicator 111, an audio/video (A/V) inputter 112, a user interface 113, a display 114, a nonvolatile storage medium 115, and a system memory 117.

The communicator 111 is configured to transmit a wireless signal to at least one of a base station, an external server, and an external terminal over a mobile communication network. In this case, the wireless signal may include a voice call signal, a video call signal, or various types of data in accordance with text/multimedia message transmission and reception.

Further, the communicator 111 is configured to connect to a wireless Internet. Further, the communicator 111 may be configured to perform near field communication, and near field communication technologies, such as Bluetooth, radio frequency identification (RFID), infrared data association (IrDA), ultra-wideband (UWB), and ZigBee, may be used.

The A/V inputter 112 is configured to input an audio signal and a video signal, and may include a microphone and a camera. The camera processes an image obtained by an image sensor. The image processed by the camera may be stored in the system memory 117 or may be transmitted to outside through the communicator 111.

The user interface 113 receives a user input for controlling the operation of the user terminal 110 or a processor 116. The user interface 113 may include a keypad, a dome switch, a touchpad (capacitive/resistive), a jog wheel, a jog switch, and a finger mouse. In particular, if the touchpad is integrally formed with the display 114, it may be called a touch screen. In this case, the user interface 113 may be visualized by the display 114.

The display 114 operates in response to the control of the processor 116. The display 114 displays information processed by the user terminal 110 or the processor 116. If the display 114 is integrally formed with the touchpad to constitute the touch screen, the display 114 may visualize the user interface. The display 114 may include at least one of various types of displays, such as a liquid crystal display, an organic light-emitting diode display, and a flexible display.

The nonvolatile storage medium 115 may be of at least one of a flash memory type, a hard disk type, and a multimedia card type. The nonvolatile storage medium 115 is configured to write and read data in response to the control of the processor 116.

The processor 116 may include any one of a general purpose processor and a dedicated processor, and control operations of the communicator 111, the A/V inputter 112, the user interface 113, the display 114, the nonvolatile storage medium 115, and the system memory 117.

When executed, the processor 116 is configured to load program codes including instructions for providing various functions from the nonvolatile storage medium 115 to the system memory 117, and to execute the loaded program codes. As described above, the processor 116 may load a web browser 118 into the system memory 117, and may execute the loaded web browser 118. The user terminal 110 may access the SNS server 120 of FIG. 1 through the web browser 118. In embodiments, the system memory 117 may be provided as a working memory of the processor 116. The processor 116 may include an additional working memory. In embodiments, the system memory 117 may be provided as a buffer memory.

The system memory 117 may include at least one of a random access memory (RAM), a read only memory (ROM), and storage media readable by other-type computers.

Figure 7:
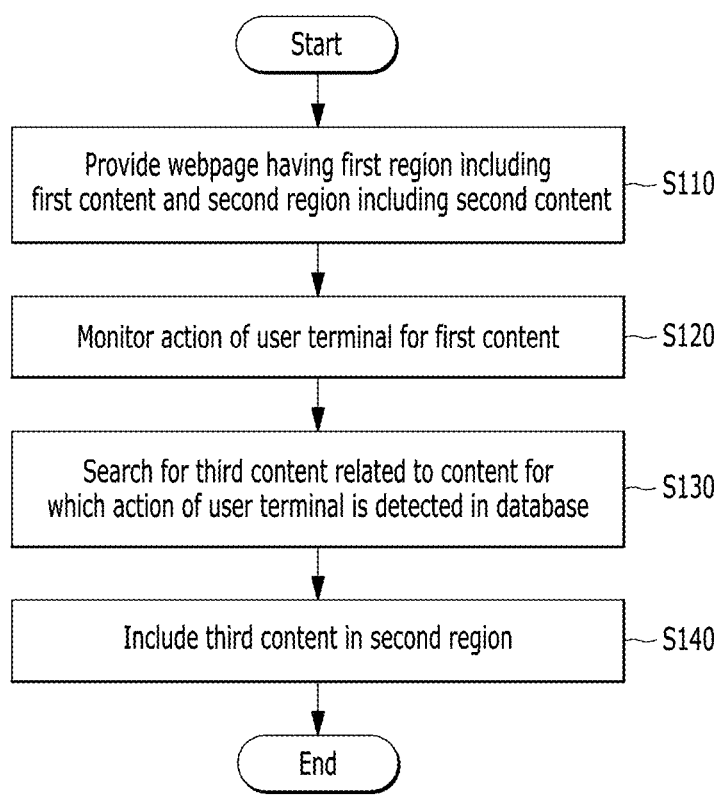
FIG. 7 is a flowchart illustrating a method for providing a webpage from an SNS server to a user terminal according to an embodiment of the present disclosure.

FIG. 7 is a flowchart illustrating a method for providing a webpage from an SNS server to a user terminal according to an embodiment of the present disclosure.

Referring to FIGS. 1 and 7, at operation S110, the SNS server 120 provides, to the user terminal 110, a webpage having a first region including pieces of first content and a second region including pieces of second content. In this case, the first and second regions are arranged in a first direction on a screen of the user terminal 110, the pieces of first content are arranged in a second direction in the first region, and the pieces of second content are arranged in the second direction in the second region. The second direction may be different from the first direction. For example, the first direction may cross or be substantially perpendicular to the second direction. The first direction and second direction may be, for example, but not limited to, a horizontal direction and a vertical direction, respectively, and vice versa.

At operation S120, the SNS server 120 monitors the action of the user terminal 110 for the pieces of first content or the action or input of the user terminal 110 associated with first content.

At operation S130, the SNS server 120 searches for third content related to the content for which the action of the user terminal 110 is detected, or the content corresponding to the action or input of the user terminal 110 associated with the first content, in the database (DB). The related content may be determined through various methods. In embodiments, a text included in the content for which the action of the user terminal 110 is detected may be extracted, and the content including the extracted text among the pieces of content (CNT) in the database (DB) may be searched for. In another embodiments, an image included in the content for which the action of the user terminal 110 is detected may be extracted, and the content having an image matching the extracted image among the pieces of content (CNT) in the database (DB) may be searched for.

At operation S140, the SNS server 120 includes or adds the third content in or to the second region of the webpage. For example, the third content may be provided as one of the pieces of content provided to the user terminal 110 when the second region is scrolled.

In embodiments of the present disclosure, the first region may be the main region 220 (refer to FIG. 2), and the second region may be the banner region 230 (refer to FIG. 2). Alternatively, the first region may be the banner region 230, and the second region may be the main region 220.

According to an embodiment of the present disclosure, a method for providing a webpage detects the action or input of the user terminal 110 in the first region of the webpage, and includes or adds the content related to the action or input of the user terminal 110 in the second region of the webpage. Accordingly, the content that is expected to be concerned or interested by the user may be provided. Further, since the content is provided as a part of the webpage, rather than the type, such as a popup message, the content may be exposed regardless of the settings for the popup message in the user terminal 110, and thus the method may provide improved reliability with respect to the exposure of the content.

Figure 8:
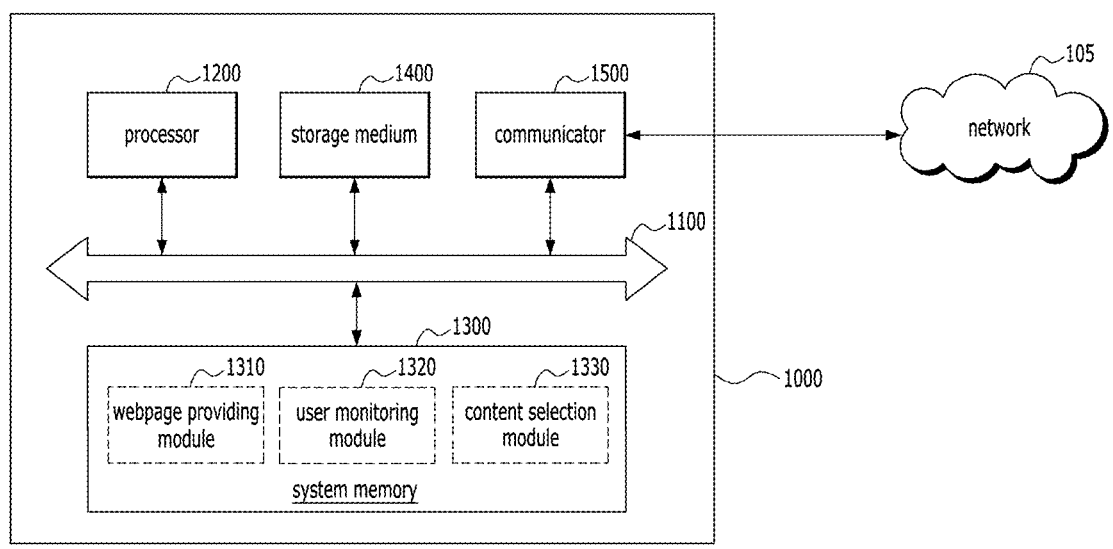
FIG. 8 is a block diagram of an exemplary embodiment of a computer device capable of implementing a network server of FIG. 1.

FIG. 8 is a block diagram of an exemplary computer device capable of implementing a network server of FIG. 1.

Referring to FIG. 8, a computer device 1000 includes a bus 1100, at least one processor 1200, a system memory 1300, a storage medium 1400, and a communicator 1500.

The bus 1100 is connected to various components of the computer device 1000 to transfer data, signals, and information. The processor 1200 may be any one of a general purpose processor and a dedicated processor, and may control the overall operations of the computer device 1000.

The processor 1200 is configured to load program codes including instructions for providing, when executed, various functions into the system memory 1300, and to process the loaded program codes. For example, the system memory 1300 may be provided as a working memory of the processor 1200.

POW As an embodiment, the system memory 1300 may include at least one of a random access memory (RAM), a read only memory (ROM), and media readable by other-type computers.

Together with the system memory 1300, the processor 1200 may function as the controller 122 of FIG. 1. The processor 1200 may load, into the system memory 1300, a webpage providing module 1310 providing capabilities or functions of the webpage provider 123 of FIG. 1 when executed by the processor 1200, a user monitoring module 1320 providing capabilities or functions of the user monitor 124 of FIG. 1 when executed by the processor 1200, and a content selection module 1330 providing capabilities or functions of the content selector 125 of FIG. 1 when executed by the processor 1200. Such program codes may be executed by the processor 1200 to perform the operations of the SNS server 120 as described above with reference to FIG. 7. In addition, the system memory 1300 may further include program codes providing additional functions when executed by the processor 1200.

The program codes to be loaded into the system memory 1300 may be loaded from a storage medium 1400 that is a separate computer-readable recording medium. The program codes may be loaded from an external device into the system memory 1300 through the communicator 1500. Further, the storage medium 1400 may function as at least a part of the database (DB) of FIG. 1. In this case, the storage medium 1400 may store the pieces of content (CNT) of FIG. 1 and webpage sources (WPS).

In embodiments, the storage medium 1400 may include various types of nonvolatile storage media to maintain the stored data even if a power supply is blocked, for example, a flash memory and a hard disk.

The communicator (or transceiver) 1500 transmits and receives signals between the computer device 1000 and other devices in the network system 100 of FIG. 1 through the network 105. At least a part of the communicator 1500 may function as the communication interface 121 of FIG. 1. In the case where the database (DB) is provided as an external device, the communicator 1500 may communicate with the database (DB) through the network 105 in response to the control of the processor 1200.

Although specific embodiments and application examples have been described herein, they are merely to help comprehensive understanding of the present disclosure, but the present disclosure is not limited to the above-described embodiments. Various corrections and modifications are possible from the description by those of ordinary skill in the art to which the present disclosure pertains.

Accordingly, the subject matter of the present disclosure should not be limited based on the described embodiments, and it may be construed that not only claims to be described later but also all equal or equivalent modifications of the claims belong to the scope of the present disclosure.

What is claimed is:

1. A network server for providing a webpage through communication with a user terminal over a network, comprising:
  a webpage provider configured to provide to the user terminal the webpage including a first region and a second region, which are arranged in a first direction, in response to a request from the user terminal, wherein the first region includes pieces of first content arranged in a second direction crossing the first direction, and the second region includes pieces of second content arranged in the second direction;
  a user monitor configured to detect an action of the user terminal associated with at least one of the pieces of first content; and
  a content selector configured to:
  search for pieces of third content related to the at least one of the pieces of first content, associated with the action of the user terminal detected by the user monitor, among the pieces of first content stored in a database, and
  in response to a user input scrolling the second region along the second direction crossing the first direction, arrange the searched pieces of third content related to the at least one of the pieces of first content, associated with the action of the user terminal detected by the user monitor, next to the pieces of second content with respect to the second direction crossing the first direction and in the scrolled second region of the webpage.

2. The network server of claim 1, wherein:
  each of the pieces of first content includes one or more items capable of being updated by the user terminal, and
  the action of the user terminal includes an update of the one or more items by the user terminal.

3. The network server of claim 2, wherein the one or more items capable of being updated by the user terminal include a count value being changed in response to selection of the user terminal.

4. The network server of claim 2, wherein the one or more items capable of being updated by the user terminal include a comment being generated by the user terminal.

5. The network server of claim 1, wherein:
  the webpage further includes a third region arranged in the first direction together with the first and second regions,
  the first region extends in the second direction between the second region and the third region, and
  the second region is adjacent to the first region and extends in the second direction.

6. The network server of claim 1, wherein:
the webpage further includes a third region arranged in the first direction together with the first and second regions,
the second region extends in the second direction between the first region and the third region, and
the first region is adjacent to the second region and extends in the second direction.

7. The network server of claim 1, wherein the first region is a main region including one or more sub-webpages and the second region is a banner region including advertising content, the one or more sub-webpages included in the main region and pieces of the advertising content included in the banner region are arranged in a same direction as each other, and the main region and the banner region are arranged with respect to each other in a different direction than a direction that the one or more sub-webpages included in the main region and the pieces of the advertising content included in the banner region are arranged.

8. A method for operating a network server communicating with a user terminal over a network, comprising:
providing, by the network server, to the user terminal a webpage including a first region and a second region, which are arranged in a first direction, in response to a request from the user terminal, wherein the first region includes pieces of first content arranged in a second direction crossing the first direction, and the second region includes pieces of second content arranged in the second direction;
detecting an action of the user terminal associated with at least one of the pieces of first content;
searching for pieces of third content related to the at least one of the pieces of first content, associated with the action of the user terminal detected by the user monitor, among the pieces of first content stored in a database; and
in response to a user input scrolling the second region along the second direction crossing the first direction, arranging the searched pieces of third content related to the at least one of the pieces of first content, associated with the action of the user terminal detected by the user monitor, next to the pieces of second content with respect to the second direction crossing the first direction and in the scrolled second region of the webpage.

9. The method of claim 8, wherein the first region is a main region including one or more sub-webpages and the second region is a banner region including advertising content, the one or more sub-webpages included in the main region and pieces of the advertising content included in the banner region are arranged in a same direction as each other, and the main region and the banner region are arranged with respect to each other in a different direction than a direction that the one or more sub-webpages included in the main region and the pieces of the advertising content included in the banner region are arranged.

10. A computer device for providing a web service through communication with a user terminal over a network, comprising:

a communicator connected to the network; and
a processor configured to communicate with the user terminal through the communicator,
wherein the processor is configured to:
provide to the user terminal a webpage including a first region and a second region, which are arranged in a first direction, in response to a request from the user terminal, wherein the first region includes pieces of first content arranged in a second direction crossing the first direction, and the second region includes pieces of second content arranged in the second direction;
detect an action of the user terminal associated with at least one of the pieces of first content; and
search for pieces of third content related to the action of the user terminal associated with the at least one of the pieces of first content among the pieces of first content stored in a database, and
in response to a user input scrolling the second region along the second direction crossing the first direction, arrange the searched pieces of the third content related to the at least one of the pieces of first content, associated with the action of the user terminal detected by the user monitor, next to the pieces of second content with respect to the second direction crossing the first direction and in the scrolled second region of the webpage.

11. The computer device of claim 10, wherein:
each of the pieces of first content includes one or more items capable of being updated by the user terminal, and
the action of the user terminal includes an update of the one or more items by the user terminal.

12. The computer device of claim 10, wherein the first region is a main region including one or more sub-webpages and the second region is a banner region including advertising content, the one or more sub-webpages included in the main region and pieces of the advertising content included in the banner region are arranged in a same direction as each other, and the main region and the banner region are arranged with respect to each other in a different direction than a direction that the one or more sub-webpages included in the main region and the pieces of the advertising content included in the banner region are arranged.

13. The computer device of claim 10, wherein the first region is a main region including one or more sub-webpages and the second region is a banner region including advertising content, and the processor is configured to provide in the second region of the webpage the advertising content which is searched based on the action of the user terminal detected in the first region.

14. The computer device of claim 10, wherein a scrollable direction of the first region and a scrollable direction of the second region are identical to each other, and the first region and the second region are arranged with respect to each other in a different direction of the scrollable directions of the first and second regions.

* * * * *